United States Patent

Herter

[11] Patent Number: 4,518,423
[45] Date of Patent: May 21, 1985

[54] METHOD FOR PREPARING A LOW RESIDUAL ALLOY STEEL CHARGE FROM SCRAP METAL

[76] Inventor: Carl J. Herter, 1638 Walnut St., Allentown, Pa. 18102

[21] Appl. No.: 590,028

[22] Filed: Mar. 15, 1984

Related U.S. Application Data

[63] Continuation-in-part of Ser. No. 529,290, Sep. 6, 1983.

[51] Int. Cl.³ .................................................. C22B 25/06
[52] U.S. Cl. .................................... 75/64; 75/44S; 75/85; 423/90; 423/96
[58] Field of Search ................... 75/64, 85, 44 S; 423/90, 96

[56] References Cited

U.S. PATENT DOCUMENTS 1,202,886 10/1916 Phelps .................................. 423/90
2,268,484 12/1941 Hill ........................................ 75/64

*Primary Examiner*—Melvyn J. Andrews
*Attorney, Agent, or Firm*—Ruth Moyerman

[57] ABSTRACT

A process is disclosed for treating tin scraps such as tin cans and home scrap, to reduce the tin content of the scrap to a sufficient level to permit the scrap to be reprocessed in an electric furnace. In the process, the scrap metal is first shredded, or chopped, to a managable size which is then utilized as a charge to a kiln. The kiln is maintained as an oxidizing atmosphere. The beginning feed end temperature is not less than 2000 degrees F. The temperature is reduced to not less than about 1650 degrees F. to convert a part of the iron-tin alloy into its epsilon phase. The kiln temperature is then further reduced to not less than 1400 degrees F. to further convert a part of the iron-tin alloy to form the zeta phase. The epsilon and zeta phases additionally produce an oxide laden dust that is then removed. As the charge moves through the kiln, the temperature is further reduced to not less than 900 degrees F. to form the eta phase of the iron-tin alloy and additionally a metallic scale formation. An autogenous mill, where the feed particles are tumbled against each other, descales them. The metallic scale produced thereby is removed. The feed remaining has now had sufficient residual alloys removed to allow its use as a direct charge in a steel producing furnace.

13 Claims, 1 Drawing Figure

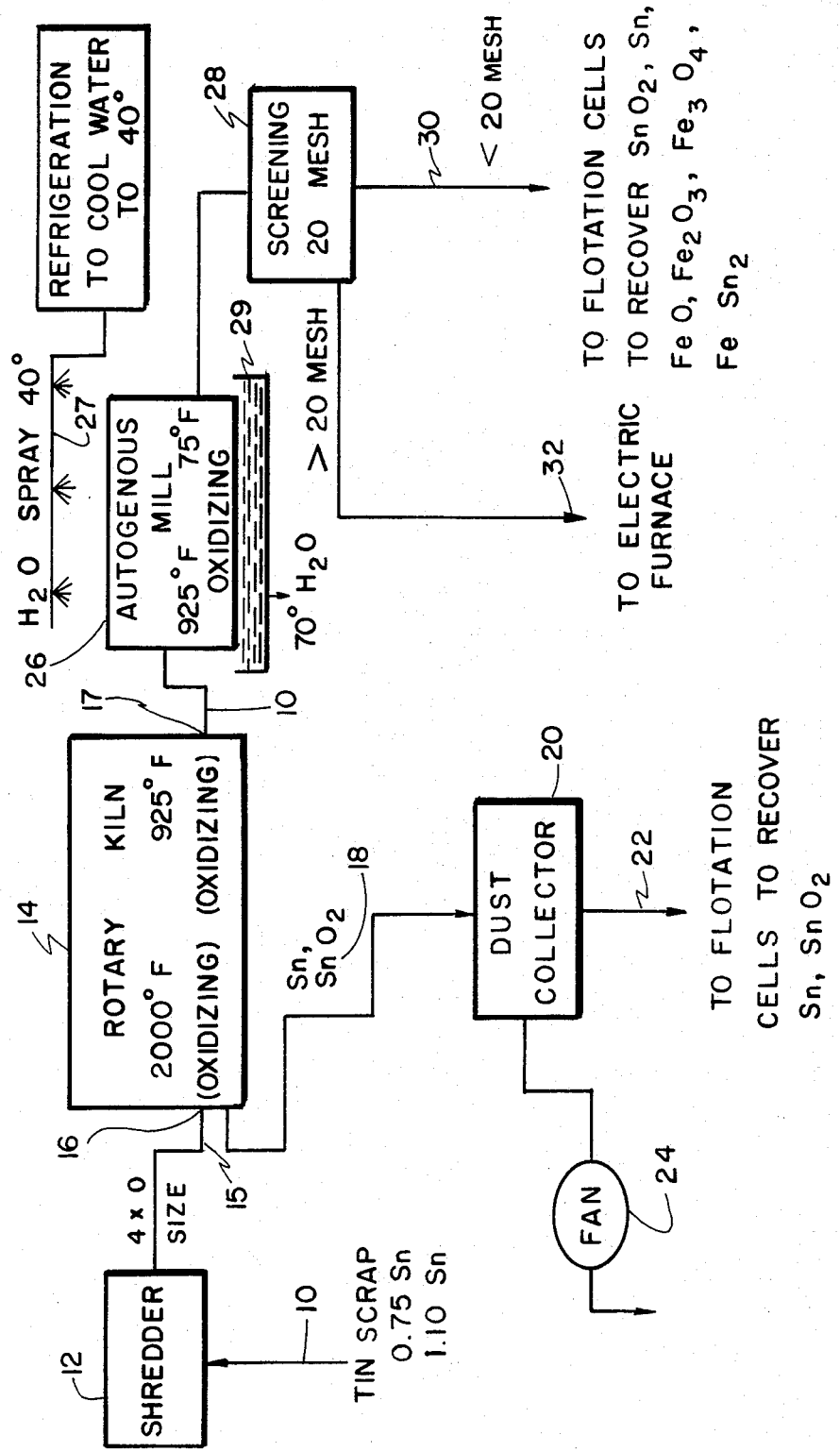

METHOD FOR PREPARING A LOW RESIDUAL ALLOY STEEL CHARGE FROM SCRAP METAL

CROSS REFERENCES TO RELATED APPLICATIONS

This application is a continuation-in-part of application Ser. No. 06/529,290 filed Sept. 6, 1983.

BACKGROUND OF THE INVENTION

1. Field of the Invention

This invention relates to metalurgy, and more particularly to iron and steel recovery from scrap metal.

2. Description of the Prior Art

Goods for business and personal households are often packaged in containers of tin coated metal. Therefore, each day, as we consume or use such products, we create a major disposal and polution problem. Furthermore, residue from steel making operations such as side trims, crop ends and other tin scraps resulting from tin lines and known collectively as home scrap, create an additional disposal and polution problem. With a constant concern over depleting our natural resources and our environmental protection, Environmental Protection Agency approved recycling of iron-tin alloy products is to the advantage of every individual, corporation and government agency.

Tin coated, iron based scrap would have an application in the steel making process if a low cost method could be found to reduce the residual alloys, namely tin, tin oxide, iron tin alloy, iron, ferrous oxide, ferric oxide and magnetite, and thus leave a low residual alloy steel feed suitable for, primarily, electric furnaces.

I have now discovered that a method related to the method I used in application Ser. No. 06/529,290, filed Sept. 6, 1983 to recover scrap metal suitable for a charge in an electric furnace from used automobiles, will also produce scrap metal suitable for a charge in an electric furnace from tin coated iron metals.

SUMMARY OF THE INVENTION

In the aforementioned application titled "Method For Preparing A Low Residual Alloy Steel Charge From Scrap Metal", Ser. No. 06/529,290, I disclosed a process wherein vehicle scrap (minus only the gas tank for safety reasons) is first shredded to a manageable size and thereafter fed into a rotary kiln. The kiln feed end is maintained at about 1700 degrees F. and an oxidizing atmosphere is provided. At this temperature, and in an oxidizing atmosphere, the zinc is fumed to zinc oxide dust. Likewise, copper is also oxidized to cuprite—a red powder form. The oxide laden dust produced may be recovered by standard flotation techniques.

As the feed continues through the kiln, the atmosphere is changed to reducing and the temperature adjusted to not less than about 1900 degrees F. to cause metallic scale to form on the feed particles. The scale is primarily copper, nickel, chromium, lead, zinc and melted aluminum.

As the feed discharges, it proceeds directly, without cooling, to a mill, preferably an autogenous mill, where lifters lift, drop and tumble the particles against each other to descale them. The metallic scale is brittle and this milling process step effectively cleanses the ferrous metal of surface alloy scale. The atmosphere must be neutral to prevent reoxidizing of the now reduced metals. The autogenous mill is cooled by, preferably refrigerated, water. The mill may be immersed in a water trough to effect this cooling, or water may be sprayed on the mill, or both.

The metallic scale dust formed may be removed by screening and recovered by flotation or other conventional means. The feed is now separated, preferably magnetically, to remove aluminum, glass and tailings. The material remaining is sufficiently reduced in residual alloy content to permit its use as a charge for electric steel making furnaces, basic oxygen furnaces or open hearth furnaces.

In this continuation-in-part application, I continue to generally utilize the aforementioned method. However, I have now discovered that a related method, by changing the composition of the scrap material or kiln feed and also changing the kiln temperatures, can be used for treating a tin coated metal. For example, when I alter the kiln feed to be that of tin, such as "tin" cans and "home scrap", containing about 0.75% to 1.1% tin, I can also recover a low residual alloy suitable for a steel charge by using a modification of the previously discussed method.

In this invention, tin scrap is first shredded to a manageable size and thereafter fed into a rotary kiln as in the previous application. The kiln feed end temperature is, however, about 2000 degrees F. and is maintained at not less than about 1650 degrees F. (preferably 1652 degrees F.) with an oxidizing atmosphere to convert at least part of the iron-tin alloy into its epsilon phase ($Fe_2Sn$) and additionally producing a dust of tin and tin oxide.

In this invention, kiln temperatures are reduced by adding air, preferably through shell fans, and adjusting air-fuel ratio of the shell burners.

As the feed continues through the kiln, the kiln temperature is further reduced to not less than about 1400 degrees F. (preferably 1452 degrees F.) with a continuing oxidizing atmosphere (rather than a reducing atmosphere as in the previous application) to further convert part of the iron-tin alloy into its zeta phase (FeSn) and producing additional oxide laden dust of tin and tin oxide.

As in the previous application, the oxide laden dust produced may also be removed in conventional dust collectors and may be recovered by standard flotation techniques.

As the feed continues through the kiln, the kiln temperature is further reduced to not less than 900 degrees F. (preferably 925 degrees F.) with a continuing oxidizing atmosphere (rather than reducing as in the prior application) to still further convert part of the iron-tin alloy into its eta phase ($FeSn_2$) and additionally producing a metallic scale formation of tin, tin oxide, iron tin alloy, iron, ferrous oxide, ferric oxide and magnetite.

In both applications, as the feed discharges, it proceeds directly, without cooling, to a mill, preferably an autogenous mill, where lifters lift, drop and tumble the particles against each other to descale them. The metallic scale is brittle and this milling process step effectively cleanses the ferrous metal of surface alloy scale. The atmosphere, in this application, must remain oxidizing so as to correspond with the oxidizing atmosphere of the kiln. The autogenous mill is cooled by, preferably refrigerated, water. The mill may be immersed in a water trough to effect this cooling, or water may be sprayed on the mill, or both.

The metallic scale dust formed is removed by screening and recovered by flotation or other conventional means. The recovered metals in this application are tin, tin oxide, iron tin alloy, iron, ferrous oxide, ferric oxide and magnetite. In this application, there is no need for magnetic separation as only the residual alloy remains after the metallic scale recovery. The material remaining is sufficiently reduced in residual alloy content, that is, 96% to 98% tin removable, to permit its use as a charge for electric steel making furnaces, basic oxygen furnaces and open hearth furnaces.

Therefore, the object of this invention is to provide a suitable steel charge of low residual alloy from tin-coated metals.

It is another object of this invention to provide a process for recycling tin cans and home scrap from steel plant operations with greater cost effectiveness than is now possible by other methods.

It is another object of this invention to effect the aforementioned cost savings by a process which is faster than prior art processes by providing a continuous production line for producing a furnace charge.

It is yet another object of this invention to provide an iron-tin alloy charge for electric furnaces which, by virtue of its lower alloy, e.g. non-ferrous component, requires less retention in the electric furnace and less use of lime.

It is also an object of this invention to provide a tin coated metal process which is ecologically advantageous because the entire scrap is processed.

It is still another object of this invention to provide a process which is less expensive by providing a method whereby only an oxidizing kiln operation is required.

It is yet another object of this invention to solve a fume disposal problem and Environmental Protection Agency requirement in that the process can also remove the tin from home scrap found in steel making furnaces, and this can be removed prior to scrap charge to the basic oxygen furnace or open hearth furnace. This would provide a tin free fume from the furnace, and enable the fume to be pelletized, indurated for a charge to the blast furnace. This cannot be done at the present time since the fume contains zinc, tin and lead; when charged to the blast furnace in the form of pellets would attack the refractory lining. This process thus solves a fume disposal problem and solves an Environmental Protection Agency requirement in that the zinc, tin and lead rich fume should not be dumped, but recycled to the blast furnace.

These and other objects will be more readily ascertainable to one skilled in the art from a consideration of the following FIGURE, descriptions and exemplary embodiments.

BRIEF DESCRIPTION OF THE DRAWING

The drawing illustrates a flow chart of the process of this invention.

DETAILED DESCRIPTION OF THE PREFERRED EMBODIMENT(S)

Referring now to the Drawing, tin coated metal 10, containing 0.75% to 1.10% tin, is prepared as feed as it passes through shredder 12. Shredder 12 may be of the conventional grinding mechanism type, and grinds scrap 10 to a managable average size, preferably about 4×0. Scrap 10 is then moved as feed to rotary kiln 14 at feed end 16. This conveyance may be by, for example, a conventional pan feeder which is represented at 15.

Rotary kiln 14, which may be a standard kiln such as a Lurgi type, has a beginning temperature at the feed end of about 2000 degrees F. and the atmosphere is kept as an oxidizing atmosphere throughout the process. The temperature is then reduced by air fans to not less than about 1650 degrees F. (preferably 1652 degrees F.) to convert at least part of the iron-tin alloy 10 into its epsilon phase and additionally producing an oxide laden dust of tin and tin oxide as indicated at 18.

Kiln 14's temperature is further reduced by air fans to not less than about 1400 degrees F., preferably 1452 degrees F., to further convert part of tin coated metal 10 into its zeta phase, additionally producing an oxide laden dust of tin and tin oxide also indicated at 18.

Tin and tin oxide at 18 may be collected at dust collector 20 and removed thereafter by flotation cells as indicated at 22, or other conventional means to separate and recover the tin and tin oxide. Removal of powder 18 from kiln 14 is aided by the use of an induced draft fan 24.

As feed 10 moves along kiln 14, the temperature is further reduced by air fans to not less than 900 degrees F., preferably 925 degrees F., to further convert part of iron-tin alloy 10 into its eta phase and, additionally producing a metallic scale formation.

As feed 10 leaves rotary kiln 14 at its discharge end 17, it proceeds to autogenous mill 26. The feed may be transported from kiln 14 to mill 26 by a bifurcated chute, if desired, to remove samples for testing. Autogenous mill 26 functions to cause scrap 10 to tumble and fall against itself for the purpose of removing the now formed brittle coatings of the eta phase of iron-tin scrap feed 10.

Feed 10 proceeds to mill 26 without intermittent cooling and thus mill 26 would be heated by feed 10. Initial mill temperature may be as high, therefore, as 925 degrees F. Spray cooling by water 27, or an immersion bath of mill 26, shown at 29, can be utilized to cool mill 26 to about 75 degrees F.

Autogenous mill 26 is preferably fitted with lifters as is conventional in this art. Lifters are utilized to pick up feed 10, dropping it on itself to achieve the cleaning of the metal alloys from the remaining scrap which is now largely iron in composition. Tumbling may also be employed to achieve this separation from feed 10.

Following treatment in autogenous mill 26, feed 10 progresses through screen 28 at preferably about 20 mesh. Tin oxide, tin, iron tin alloy, iron, ferrous oxide, ferric oxide and magnetite, as material of less than 20 mesh, may be separated by flotation cells as indicated at 30. Material greater than 20 mesh is now sufficiently reduced to alloy content of tin from about 0.75% to about 0.03% tin and the 1.1% tin plate is reduced to about 0.022% tin, each of which is suitably low for use as a direct charge for a steel making furnace 32.

In practicing the process of this invention, it should be noted that the following parameters are critical. The epsilon phase is stable from 1400 degrees F. to 1652 degrees F. The zeta phase is stable at all temperatures below 1472 degrees F. The eta phase is stable below 925 degrees F. Therefore, temperatures associated with these phases must be maintained as close as possible to get the maximum conversion.

It is also critical to maintain an oxidizing atmosphere within the kiln and autogenous mill to achieve this phase change.

While not critical, a feed size of 4×0 performs best, because of a combination of handling considerations and the need to bring the feed up to near kiln temperatures. Also, a small feed size increases the surface area and therefore reduces retention time and thereafter permits use of a smaller size kiln.

The method of this invention has many advantages. Chiefly among these is that waste material can be recycled into a low residual alloy steel feed for, primarily, electric furnaces.

Secondly, the low residual alloy steel feed provides a tin free fume from the furnace, enabling the fume to be pelletized and indurated, and thus recycled into the blast furnace.

Having now described and illustrated my invention, it is not intended that such description be limiting, but rather that the invention be limited only by a reasonable interpretation of the appended claims.

What is claimed is:

1. A method of preparing a low residual alloy for a steel charge from a tin coated, iron based metal comprising:
   (a) introducing tin scraps into a feed end of a kiln wherein said kiln includes temperature and atmospheric zones, said kiln's feed end having an oxidizing atmosphere and a beginning feed end temperature of not less than 2000 degrees F. and maintaining said kiln's feed end zone temperature at not less than about 1650 degrees F. to convert at least part of any iron-tin alloy present into its epsilon phase and, thereby, additionally producing an oxide laden dust of mixed tin, tin oxide and iron;
   (b) advancing said feed through said kiln from said feed end to approximate said kiln's midsection, wherein said kiln's midsection temperature is not less than about 1400 degrees F. to further convert part of said iron-tin alloy into the zeta phase and, thereby, additionally producing an additional oxide laden dust of tin, tin oxide and iron;
   (c) removing said oxide laden dust of part (a) and part (b) from said kiln;
   (d) still further advancing said feed through said kiln from said midsection to said kiln's exit end wherein said kiln's exit end temperature is not less than about 900 degrees F. to further convert part of said iron-tin alloy into its eta phase and additionally producing a metallic scale formation composed of variously tin, tin oxide, iron tin alloy, iron, ferrous oxide, ferric oxide and magnetite on said feed; and,
   (e) separating and removing said scale from said feed to leave a low alloy scrap metal feed suitable for use as a charge in a steel making furnace.

2. The method according to claim 1 wherein said tin scrap feed is generally derived from tin cans and home scrap.

3. The method according to claim 1 wherein said tin scrap feed is of generally average 4×0 mesh size.

4. The method according to claim 1 wherein said kiln is a rotary kiln.

5. The method according to claim 1 wherein said oxide laden dust of steps (a) and (b) is removed from said kiln by collection in a dust collector and is thereafter separated into iron, tin and tin oxide by flotation.

6. The method according to claim 1 wherein said separating of step (e) is by autogenous milling.

7. The method according to claim 1 wherein said removing scale of step (e) is by screening.

8. The method according to claim 7 wherein said process further comprises recovering tin, tin oxide, iron tin alloy, iron, ferrous oxide, ferric oxide and magnetite from said metal scale screenings.

9. The method according to claim 7 wherein said screening of step (e) utilizes about a 20 mesh screen.

10. The method according to claim 8 wherein recovery is by flotation.

11. The method according to claim 1 wherein said tin scrap of part (a) contains from about 0.75% to about 1.1% tin.

12. The method according to claim 1 wherein said suitable charge of step (c) contains from about 0.03% to about 0.022% tin.

13. A method of preparing a low residual alloy for steel charge from iron based tin scrap comprising:
   (a) subjecting tin scrap alloys to mechanical shredding to produce a generally uniform particle feed size of about 4×0 mesh size;
   (b) introducing said tin scrap alloys containing from about 0.75% to about 1.1% tin into a feed end of a rotary kiln, said kiln's feed end having an oxidizing atmosphere and having a beginning feed end temperature of not less than about 2000 degrees F. and maintaining said kiln's feed end temperature at not less than about 1650 degrees F. to convert part of the iron alloy to its epsilon phase and, thereby, additionally producing an oxide laden dust of tin, tin oxide and iron;
   (c) advancing said feed through said kiln from said feed end to approximate said kiln's midsection wherein said rotary kiln's midsection temperature is not less than about 1400 degrees F. to further convert other parts of said iron-tin alloy to its zeta phase and, thereby, additionally producing an oxide laden dust of tin, tin oxide and iron;
   (d) removing said oxide laden dust from said rotary kiln;
   (e) still further advancing said feed through said kiln from said midsection to said kiln's feed end, wherein said rotary kiln's exit end temperature is not less than about 900 degrees F. to still further convert part of said iron-tin alloy to its eta phase and thereby producing additionally a metallic scale formation composed of tin, tin oxide, iron-tin alloy, iron, ferrous oxide, ferric oxide and magnetite;
   (f) separating said scale from said feed by autogenous milling; and,
   (g) screening and recovering said scale at about 20 mesh to leave a scrap meetal feed suitable for use as a charge in a steel making furnace.

* * * * *